United States Patent [19]

Alles

[11] Patent Number: 4,595,995
[45] Date of Patent: Jun. 17, 1986

[54] SORT CIRCUIT AND METHOD USING MULTIPLE PARALLEL SORTS OF THE SORTED ITEMS

[75] Inventor: Harold G. Alles, Bridgewater, N.J.

[73] Assignee: AT&T Bell Laboratories, Murray Hill, N.J.

[21] Appl. No.: 467,280

[22] Filed: Feb. 17, 1983

[51] Int. Cl.[4] .............................................. G06F 7/08
[52] U.S. Cl. .................................... 364/900; 364/300
[58] Field of Search ... 364/200 MS File, 900 MS File, 364/300

[56] References Cited

U.S. PATENT DOCUMENTS

| | | | |
|---|---|---|---|
| 3,587,057 | 6/1971 | Armstrong | 364/900 |
| 3,872,289 | 3/1975 | Kawanabe | 364/710 |
| 3,931,612 | 1/1976 | Stevens et al. | 364/900 |
| 4,003,031 | 1/1977 | Kashio | 364/900 |
| 4,030,077 | 6/1977 | Florence et al. | 364/900 |
| 4,031,520 | 6/1977 | Rohner | 364/900 |
| 4,064,556 | 12/1977 | Edelberg et al. | 364/900 |
| 4,110,837 | 8/1978 | Chen | 364/900 |
| 4,131,947 | 12/1978 | Armstrong | 364/900 |
| 4,410,960 | 10/1983 | Kasuya | 364/900 |
| 4,414,643 | 11/1983 | Meyer | 364/900 |
| 4,425,617 | 1/1984 | Sherwood | 364/200 |
| 4,464,732 | 8/1984 | Clark | 364/900 |
| 4,520,456 | 5/1985 | Miranker et al. | 364/900 |

OTHER PUBLICATIONS

D. E. Knuth, "Sorting and Searching," *The Art of Computer Programming*, vol. 3, 1973, pp. 170–180.

Primary Examiner—Harvey E. Springborn
Assistant Examiner—A. Williams
Attorney, Agent, or Firm—Ronald D. Slusky

[57] ABSTRACT

In a sort circuit comprised of m sort stages, the sort stages perform respective sorts, in parallel, on each input word as it is received. In particular, in the $j^{th}$ one of the stages, $j=1,2,\ldots m$, a bit is associated with each different possible pattern of the values of the $D_j$ highest-order digits in the input word, $D_1 > D_2 > \ldots D_m$. As each input word is received, the values of its $D_j$ higher-order digits are examined and the associated bit is set.

During output processing, the $j^{th}$ stage of the sort circuit receives from the $(j+1)^{st}$ stage a $D_{j+1}$-digit pattern representing the $D_{j+1}$ highest-order digits of a word or words previously input to the sort circuit. The $D_{j+1}$-digit pattern is used to identify the bits within the $j^{th}$ stage associated with the $D_j$-digit patterns whose $D_{j+1}$ highest-order digits match the input pattern. The bits thus identified are processed within the $j^{th}$ stage using priority logic circuitry so as to provide the $D_j$-digit patterns associated with the ones of the identified bits which are set. These $D_j$-digit patterns are provided to the $(j-1)^{st}$ stage as its input digit pattern or, in the case of $j=1$, to the utilizing system. When the $j^{th}$ stage has processed all of the bits identified in response to a particular $D_{j+1}$-digit pattern, it requests a new pattern from the $(j+1)^{st}$ stage.

7 Claims, 6 Drawing Figures

SORT CIRCUIT AND METHOD USING MULTIPLE PARALLEL SORTS OF THE SORTED ITEMS

BACKGROUND OF THE INVENTION

The present invention relates to electronic sorting.

As the state of VLSI technology has continued to provide increased circuit densities, it has become practical to migrate into hardware many data processing functions that have traditionally been implemented in software. Multiplication, array processing, and fast Fourier transform processing are but several examples. In this vein, much interest has arisen in the past few years in the hardware realization of the sorting function, i.e., the rearrangement of a plurality of multi-digit input words or values in accordance with some predetermined criterion, such as numerical order. Indeed, hardware implementation of many of the standard sorting techniques have been proposed. A number of these arrangements are described, for example, in C. D. Thompson, "The VLSI Complexity of Sorting," Memorandum No. UCB/ERL M82/5, Electronics Research Laboratory, College of Engineering, University of California, Berkeley, Feb. 14, 1982. A disadvantage of most of the known sorting techniques is that in addition to the time required for input/output (I/O), a substantial amount of processing time is required to perform the sort itself. The arrangement described by Thompson, for example, require anywhere from N to (N lg$^3$ N) processing cycles to perform the sort, where N is the number of values being sorted. At least one arrangement is known which may require very little, if any, sort processing time. See, for example, U.S. Pat. No. 4,030,077 issued June 14, 1977 to J. K. Florence et al. That arrangement, however, requires a substantial amount of circuitry to do the job.

SUMMARY OF THE INVENTION

The present invention is directed to a sort circuit which overcomes many of the disadvantages of the prior art. In preferred embodiments of the invention, a plurality of m stages within the sort circuit perform respective sorts, in parallel, on each multi-digit input word as it is received. In particular, in the j$^{th}$ one of the stages, j=1,2 ... m, a bit (or other indicator) is associated with each different possible pattern of the values of the $D_j$ highest-order digits in the input word, $D_1 > D_2 > \ldots > D_m$. As each input word is received, the values of its $D_j$ highest-order digits are examined and the associated bit is set. Since there are m sort stages, then m bits are set as each word is input.

Very shortly after the last input word has been applied to the sort circuit, it is ready to begin, in response to the bits which were set, to put out the received words in sorted order. In particular, for j=1,2 ... (m−1), the j$^{th}$ stage of the sort circuit receives from the (j+1)$^{st}$ stage a $D_{j+1}$-digit pattern representing the $D_{j+1}$ highest-order digits of a word or words previously input to the sort circuit. The $D_{j+1}$-digit pattern is used to identify the bits within the j$^{th}$ stage associated with those $D_j$-digit patterns whose $D_{j+1}$ highest-order digits match the $D_{j+1}$-digit pattern. The bits thus identified are processed within the j$^{th}$ stage so as to provide the $D_j$-digit patterns associated with the ones of the identified bits which are set. These $D_j$-digit patterns are provided to the (j−1)$^{st}$ stage or, in the case of j=1, to the utilizing system. When the j$^{th}$ stage has processed all of the bits identified in response to a particular $D_{j+1}$-digit pattern, it requests a new pattern from the (j+1)$^{st}$ stage. Illustratively, the m$^{th}$ sort stage does not receive any input patterns. Rather, it simply responds to each request from the (m−1)$^{st}$ stage to provide thereto a respective $D_m$-digit pattern whose associated bit in the m$^{th}$ stage is set.

The process repeats until all of the words have been output.

DETAILED DESCRIPTION

Figure 1:
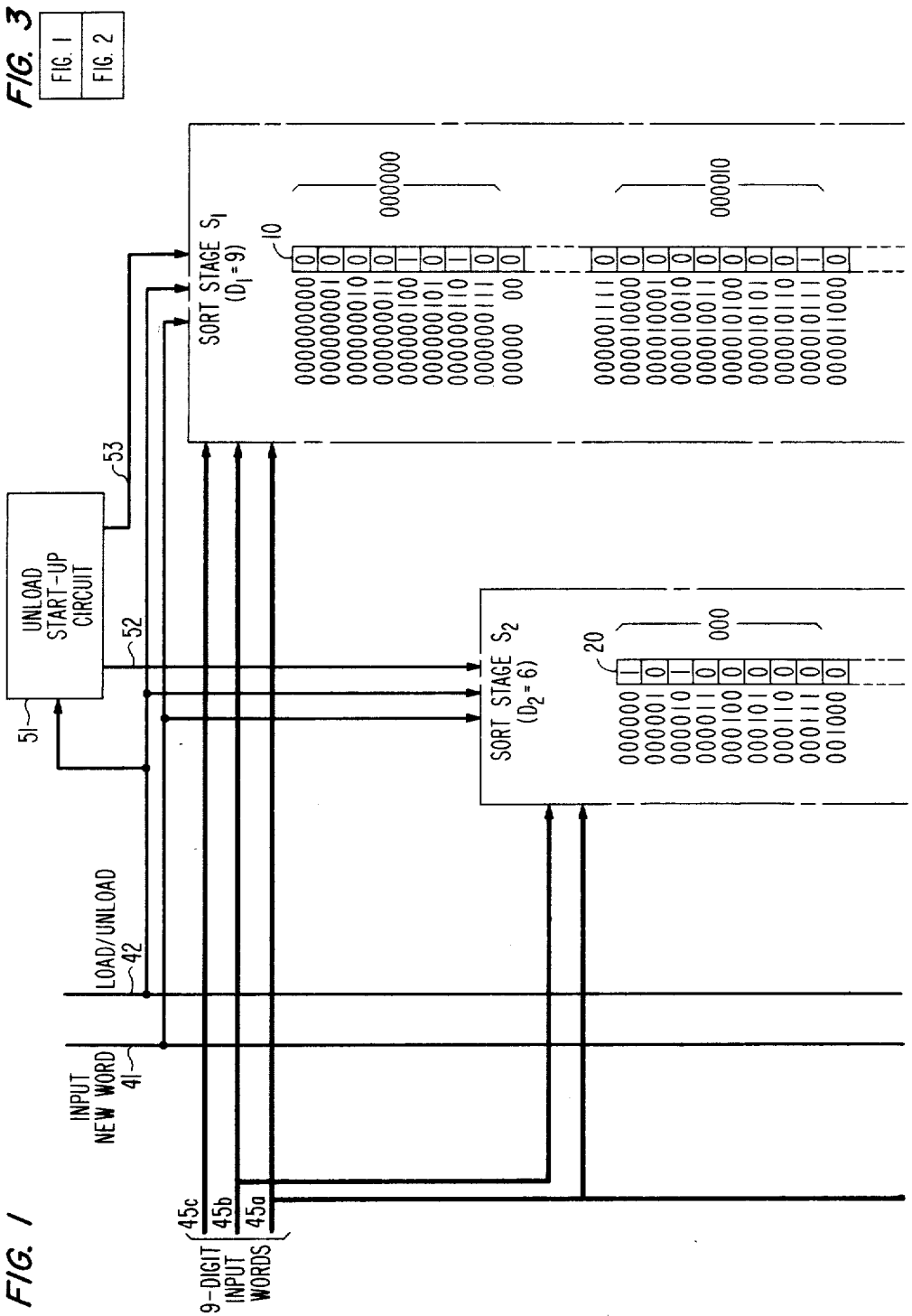
FIGS. 1-2, when arranged as shown in FIG. 3, comprise a block diagram of a sort circuit which performs the sorting technique of the present invention.
Figure 2:
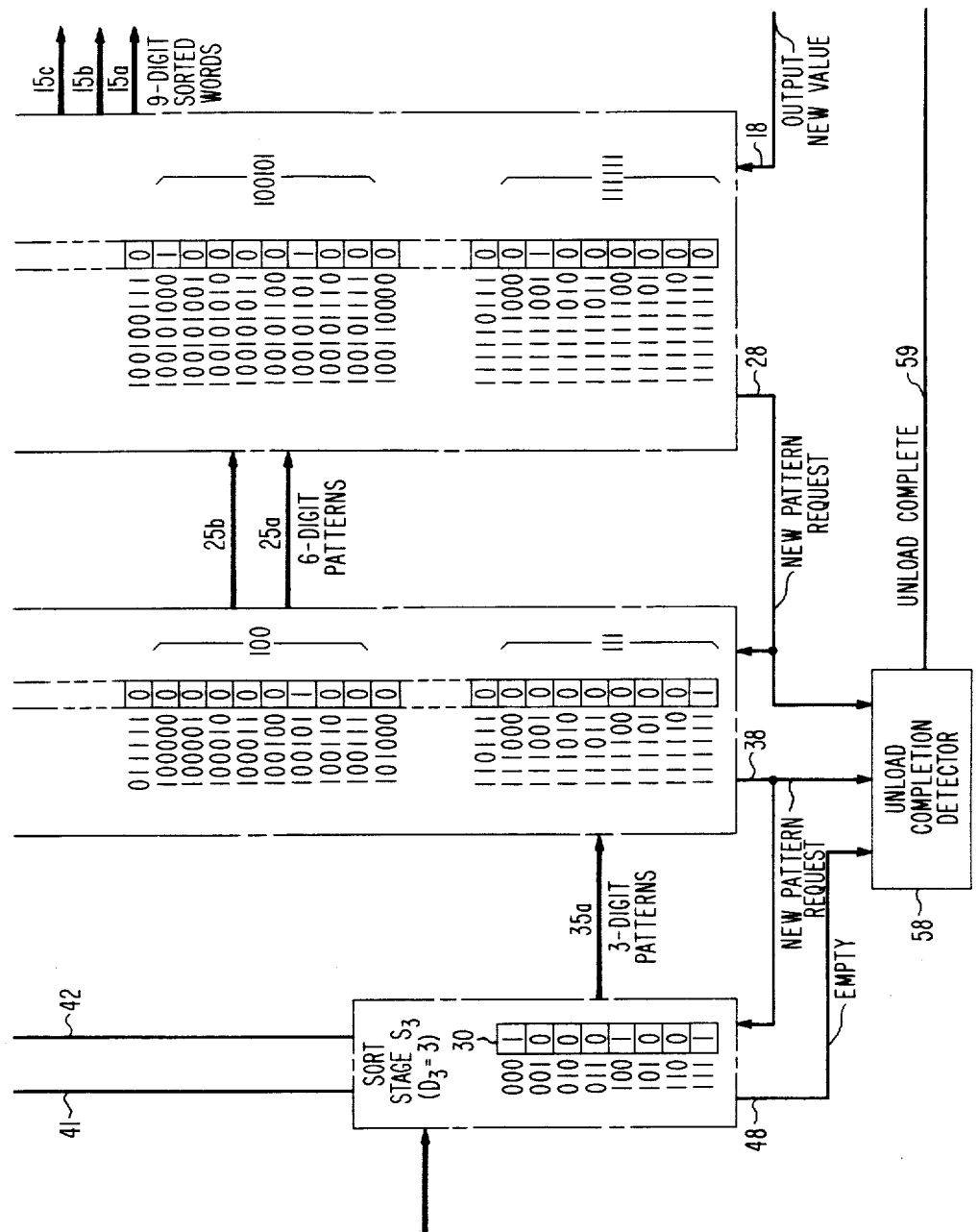

FIGS. 1-2, when arranged as shown in FIG. 3, depict a sort circuit which performs the sorting technique of the present invention. In particular, the sorting is performed by a plurality of m sort stages which operate in parallel on each input word to be sorted as the word is received. In the j$^{th}$ sort stage, $S_j$, an indicator in the form of a memory bit is associated with each different possible pattern of the values of the $D_j$ highest-order binary digits in the input word, $D_1 > D_2 > \ldots > D_m$. Illustratively, the words being sorted are binary words. Thus stage $S_j$ includes $2^{D_j}$ memory bits each associated with a respective one of the $2^{D_j}$ different possible $D_j$-digit patterns.

In the present illustrative embodiment, more particularly, the word to be sorted are of 9-bit length. There are three sort stages $S_1$, $S_2$ and $S_3$. In addition, $D_1=9$, $D_2=6$, and $D_3=3$. Thus, as shown in the drawing, sort stage $S_1$ includes a memory 10 comprising $2^9=512$ memory bits, sort stage $S_2$ includes a memory 20 comprising $2^6=64$ memory bits and sort stage $S_3$ includes a memory 30 comprising $2^3=8$ memory bits. To the left of each memory bit in stage $S_j$ is shown the $D_j$-digit pattern with which it is associated.

Figure 5:
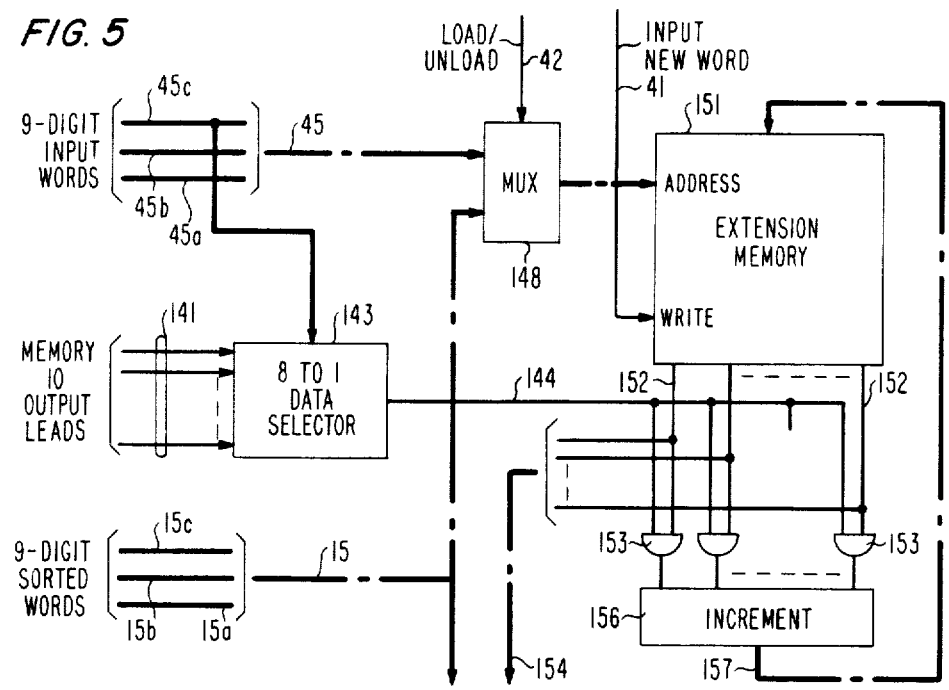
FIG. 5 is a block diagram of an auxiliary circuit which can be used in conjunction of the sort circuit of FIGS. 1-2 in order to keep track of duplicate values in the input word stream.

As will become apparent as this description continues, the sort circuit of FIGS. 1-2 does not keep track of duplicate input word values. That is, a value is provided only once in the sorted word output stream, no matter how many times it appeared in the input stream. For many applications this is not a disadvantage and, indeed, is desirable. If, on the other hand, it is desired to keep track of duplicate values, further circuitry can be combined with that of FIGS. 1-2 to perform this function. Illustrative such circuitry is shown in FIG. 5 and is described hereinbelow.

Input processing is performed by the sort circuit of FIGS. 1-2 as follows:

A system requiring the services of the sort circuit provides the input words to be sorted on the three leads 45a–c, each of which carries three digits of the input words. The $D_3=3$ highest-order digits, on lead 45a, are applied to sort stage $S_3$; the $D_2=6$ highest-order digits, on leads 45a–b, are applied to sort stage $S_2$; and the $D_1 = 9$ highest-order digits, on leads 45a–c, i.e., the entire word, are applied to sort stage $S_1$. As the system provides each input word on leads 45a–c, it pulses "input new word" lead 41, which extends to each sort stage. The utilizing system, in addition, holds load/unload lead 42 high, thereby indicating to each sort stage that it is to operate in its input, or "load," mode.

Each sort stage responds to the above-described combination of inputs by setting a single bit to "1" in its respective memory, that bit being, in sort stage $S_j$, the bit associated with the values of the $D_j$ highest-order digits of the input word. (Throughout this description, a bit is said to be "set" whenever the mechanism for setting its value to "1" is invoked, independent of the then current value of the bit. Thus a bit can be "set" any number of times, even though it is only the first "set" operation that changes its value from "0" to "1".)

By way of example, a number of bits in memories 10, 20 and 30 are shown as set, those bits having been set upon input processing of the following words in the order given:
  word A—100101000
  word B—000000110
  word C—000010111
  word D—100101000
  word E—100101101
  word F—000000100
  word G—111111001

When word A was received, the bits that were set were (a) the bit in memory 10 associated with the pattern which matches word A's $D_1 = 9$ highest-order digit values, i.e., the entire word, (b) the bit in memory 20 associated with the pattern which matches word A's $D_2 = 6$ highest-order digit values, i.e., 100101, and (c) the bit in memory 30 associated with the pattern which matches word A's $D_3 = 3$ highest-order digit values, i.e., 100. Similarly when word B was received, the memory bits that were set were the bits associated with the digit patterns 000000110 (memory 10), 000000 (memory 20) and 000 (memory 30).

When word C was received, however, bits only in memories 10 and 20 changed values when they were set because the associated bit in memory 30, i.e., the bit associated with the pattern of its $D_3 = 3$ highest-order bits, 000, was previously set when word B was input. Word D, being a duplicate of word A, caused no new bit values to be changed, and so forth.

Once the last word has been input to the sort circuit, output processing and output of the words in sorted order can begin at a time no more than m read cycle times after the last word was input, m being, again, the number of stages in the sort circuit. We will first describe the output processing with reference to the specific embodiment of FIGS. 1–2 and then restate the output processing mechanism in general terms.

In particular, the system utilizing the services of the sort circuit initiates the output processing by switching load/unload lead 42, to the low state. In response, sort stage $S_3$ processes the bits in memory 30 so as to reconstruct the digit pattern of the $D_3 = 3$ highest-order digits of the first word to be output. (As will be described in further detail hereinbelow, priority encoder circuitry is illustratively used in each sort stage to perform this processing in such a way that there is very little delay associated therewith.) Assuming that the sorted words are to be output in ascending order, the digit pattern reconstructed by sort stage $S_3$ is 000 since that is the lowest-valued pattern whose associated bit is set. The reconstructed digit pattern is applied via leads 35a to state $S_2$.

An unload startup circuit 51, which is illustratively comprised on two D-type flip flops connected in series, provides a pulse to sort stage $S_2$ on lead 52 at a predetermined time after the transition on lead 42. Sort state $S_2$ responds to this pulse by reading in the three-digit pattern on leads 35a and then pulsing "new pattern request" lead 38. The latter action causes stage $S_3$ to provide a second three-digit pattern on leads 35a—in this case the pattern 100 since that is the nextlowest-valued pattern whose associated bit is set in memory 30. A new three-digit pattern is thus ready to be read in by stage $S_2$ when it is needed.

Meanwhile, stage $S_2$ processes the bits associated with the just-read-in pattern 000. The bits identified by that pattern, as denoted in the drawing by the bracketed "000", are the bits associated with the eight patterns 000000, 000001, ..., 000111. (Note that it is guaranteed that at least one of those bits will have been set; if not, the bit in memory 30 associated with the pattern 000 would not have been set.) Stage $S_2$, upon processing the bits stored in memory 20 identified by the pattern 000, determines that the lowest-valued six-digit pattern whose associated ones of those identified bits is set is the pattern 000000. That pattern is provided to the next-lower-order stage, i.e., stage $S_1$ on leads 25a–b, each of which carries a respective three of the six digits of the pattern.

Circuit 51 provides a pulse on lead 53 at a time which is sufficiently subsequent to the pulse on lead 52 to allow stage $S_2$ to provide the six-digit pattern on leads 25a–b as just described. Sort stage $S_1$ responds to the pulse on lead 53 by reading in the pattern on leads 25a–b and then pulsing "new pattern request" lead 28. The latter action causes stage $S_2$ to provide, on leads 25a–b, a second six-digit pattern—in this case the pattern 000010 since that is the next-lowest-valued pattern whose associated bit is set in memory 20. A new pattern is thus ready to be read in by stage $S_1$ when it is needed.

Meanwhile, stage $S_1$ processes the bits associated with the patterns whose highest-order digits match the pattern 000000. The bits thus identified in stage $S_1$ are, of course, the bits associated with the eight patterns 000000001, 000000010 ... 000000111. (Note that it is guaranteed that at least one of those bits will have been set; if not, the bit in memory 20 associated with the digit pattern 000000 would not have been set.)

Stage $S_3$, upon processing the bits stored in memory 10 identified by the pattern 000000, determines that the lowest-valued nine-digit pattern whose associated bit is set is the pattern 000000100. That pattern is, in fact, the smallest of the seven input word values (word F) and it is provided to the utilizing system by stage $S_1$ on sort circuit output leads 15a–c when the system requests same by pulsing "output new value" lead 18. It will thus be appreciated that, as previously noted, the first word is ready to be put out no more than m = 3 read cycle times after the last word was input.

Stage $S_1$ further responds to the pulse on lead 18 by again processing the bits identified by the pattern 000000 to provide the next-in-order, not-yet-output word whose associated one of those identified bits is set—in this case, the word 000000110 (word B). That word is thus ready to be output on leads 15a–c when lead 18 is again pulsed.

At this point, all of the set bits identified by the input digits 000000 have been processed. As a result, when lead 18 is in fact pulsed again, stage $S_1$, in response, not only provides the second output word on leads 15a–c, as just described, but also (a) reads in the new six-digit pattern 000010 already waiting on leads 25a–b and, thereafter (b) pulses "new pattern request" lead 28. Stage $S_2$ responds to the pulse on lead 28 by providing a new six-digit pattern on leads 25a–b so that it will be ready to be read in by stage $S_1$ when needed. For the moment, however, we continue to focus attention on stage $S_1$.

In particular, stage $S_1$ now process the bits associated with the patterns whose first six digits match the new pattern 000010. There is one such bit—the one associated with the pattern 000010111—and, as before, stage $S_1$ provides that pattern on leads 15a–c as the next sort circuit output word when lead 18 is pulsed.

At this point, all of the set bits in memory 10 identified by the pattern 000010 have been processed. Thus when lead 18 is in fact pulsed again, stage $S_1$ again (a) reads in the new six-digit pattern 100101 on leads 25a–b, and (b) pulses lead 28, and so forth, until all of the words have been put out.

Meanwhile, of course, processing of the bits stored in stages $S_2$ and $S_3$ has also been going on in order to generate the patterns to be applied to stages $S_1$ and $S_2$, respectively. In particular, stage $S_2$ ($S_3$) operates to provide new six-digit (three-digit) pattern on leads 25a–b (15a) in much the same way as stage $S_3$ operates to provide output words on leads 15a–c. For example, stage $S_2$ responds to each pulse on lead 28 by processing the bits in memory 20 identified by the three-digit pattern most recently read in from leads 35a, to provide on leads 25a–b the next-in-order, not-yet-output six-digit pattern whose associated one of those bits is set. Whenever all of the set bits identified by the pattern on leads 35a have been proposed, stage $S_2$ both reads in the new three-digit pattern already waiting on leads 35a and thereafter pulses "new input pattern" request lead 38 so that stage $S_3$ will make ready a new three-digit input pattern.

Similarly, stage $S_3$ responds to each pulse on lead 38 by processing the bits in memory 30 and providing the next-in-order, not-yet-output three-digit pattern whose associated bit is set.

Once all of the set bits in memory 30 have been processed, stage $S_3$ pulses "empty" lead 48, which extends to unload completion detector 58. Leads 38 and 28 also extend to detector 58 and when all three of leads 48, 38 and 28 have been pulsed in that order, detector 58 pulses "unload complete" lead 59, thereby indicating that all the words have been output. (Although not shown in the drawing, detector 58 illustratively comprises two D-type flip flops, with leads 48, 38 and 28 being respectively connected to the D input of the first flip flop; the clock input of the first flip flop; and the clock input of the second flip flop. In addition, the output of the first flip flop is connected to the D input of the second flip flop and the output of the second flip flop is connected to lead 59.)

Having described the output, or "unloading" operation of the illustrative embodiment, we can now characterize that operation in a general way as follows:

At any point in the output processing, once initiated, sort stage $S_j$, for $j=1,2,\ldots(m-1)$, has received a $D_{j+1}$-digit pattern, the latter representing the $D_{j+1}$ highest-order digits of a word or word that was input to the sort circuit during input processing. The $D_{j+1}$-digit pattern received by stage $S_j$ is used thereby to identify the bits within that stage associated with the $D_j$-digit patterns whose $D_{j+1}$ highest-order digits match the input digit pattern. The bits thus identified are processed within stage $S_j$, in response to successive requests from stage $S_{j-1}$, so as to provide the $D_j$-digit patterns associated with the ones of the identified bits which are set. These $D_j$-digit patterns are provided to the $(j-1)^{st}$ stage or, in the case of $j=1$, to the utilizing system. When stage $S_j$ has processed all of the bits identified in response to the current digit pattern, it requests a new pattern from stage $S_{j+1}$. Stage $S_m$ does not receive any input patterns. Rather, it simply responds to each request from stage $S_{m-1}$ to provide thereto a respective $D_m$-digit pattern whose associated bit in stage $S_m$ is set.

Figure 4:
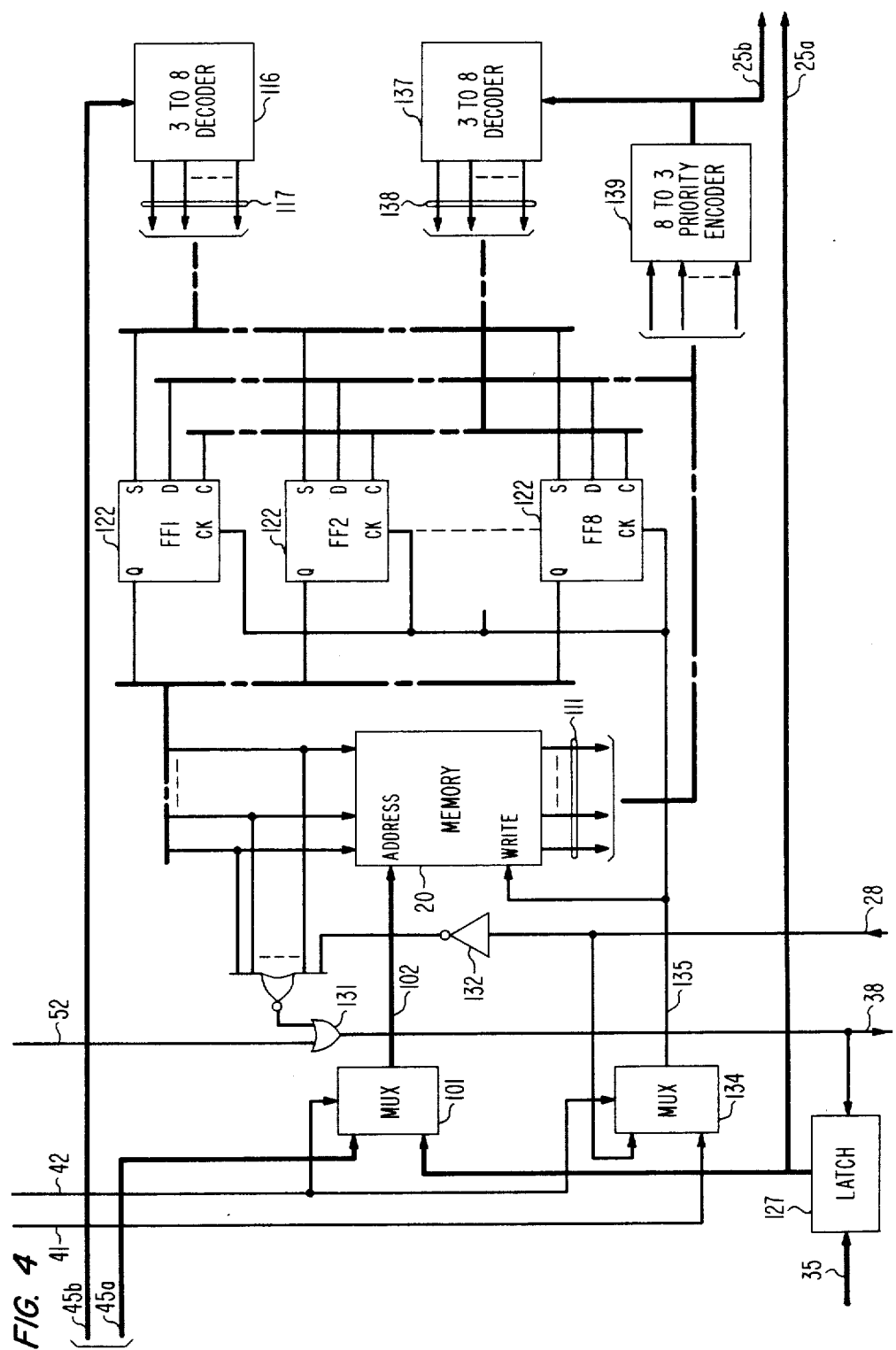
FIG. 4 is a block diagram of one of the sort stages of the sort circuit of FIGS. 1-2.

FIG. 4 is a block diagram of sort stage $S_2$. Sort stages $S_1$ and $S_3$ are very similar and will not be described in detail. The differences among the several sort stages are, however, discussed hereinafter.

As indicated in FIG. 4, load/unload lead 42 extends to an address multiplexer 101. During input processing by the sort circuit, load/unload lead 42 is low. This causes multiplexer 101 to pass the three highest-order digits of the input words on leads 45 onto leads 102 to serve as addresses for 64-bit memory 20.

Each three-digit address on leads 102 identifies an 8-bit word in memory 20, namely the eight bits associated with the eight six-digit patterns whose three highest-order digits are the same as the three-digit address. Memory 20 responds by providing that 8-bit word on its output leads 111.

As will now be described, the particular bit on leads 111 associated with the six highest-order digits of the input word is now set to "1" and the 8-bit word, thus modified, is written back into memory 20.

Load/unload lead 42 extends not only to address multiplexer 101, but also a second, control multiplexer 134. The current, low state of that lead causes multiplexer 134 to pass the pulses on lead 41 onto lead 135. The latter extends to the clock inputs of D-type flip-flops 122, while each one of leads 111 extends to the D input of a respective one of those flip flops. Thus as each new input word appears on leads 45, the bits on leads 111 are clocked into respective ones of flip flops 122, with one important exception as will now be explained.

The three next-lowest-order digits of the input words, i.e., its fourth through six highest-order digits are applied to 3-to-8 decoder 116. Decoder 116 is a standard circuit which provides a "1" on a particular one of its eight output leads 117 depending on which one of the eight possible three-bit combinations is provided to it. Each one of leads 115 extends to the set input of a respective one of flip-flops 122. Providing a "1" at the set input of a D-type flip-flop immediately switches its Q output to "1" independent of any value clocked in from its D input. The Q outputs of flip-flops 122 extend to the inputs of memory 20 and the pulse on lead 135 extends not only to the clock inputs of flip-flops 122, but also to the write input of memory 20. The overall result, as stated at the outset, is that the bit in memory 20 associated with the six highest-order digits of the input word is set to "1" in just the manner described above in conjunction with the diagram of FIGS. 1-2. The process repeats for each input word.

When unload processing is initiated, the pulse provided by start-up circuit 51 on lead 52, passes onto lead 38 via OR gate 131. Lead 38 extends to the enable input of a latch 127 and, at this point, sort stage $S_3$ has already provided the first three-digit pattern on leads 35. Thus, the pulse on lead 38 causes that pattern to be loaded into latch 127. As already described in conjunction with FIGS. 1-2, the pulse on lead 38 also passes back up to sort stage $S_3$, thereby requesting that the next three-digit pattern be provided on leads 35.

Since load/unload lead 42 is now high, multiplexer 101 provides the contents of latch 127, rather than digits on leads 45, as the address for memory 20. This identifies to memory 20 the bits associated with the eight six-digit patterns whose three highest-order digits match the input pattern. As before, those bits are provided by memory 20 on its output leads 111.

Leads 111 extend not only to flip-flops 111 as previously described, but also to 8-to-3 priority encoder 139. This is a standard type of circuit which provides to sort stage $S_1$ on leads 25b the three lowerorder digits of the lowest-valued six-digit pattern whose associated one of the bits on leads 111 is set. At the same time, the three-digit pattern stored in latch 127, comprising the three highest-order digits of the six-digit pattern in question, is provided to stage $S_1$ on leads 25a.

Since load/unload lead 42 is now high, multiplexer 134 takes its input from new pattern request lead 28, thereby causing flip-flops 122 to be clocked, and memory 20 to be written, whenever lead 28 is pulsed. As in the input processing case, this causes the bits on leads 111 to be written back into the memory with one exception. The exception is that is is necessary to change the bit associated with the pattern on leads 25a-b from "1" to "0" so that priority encoder 139 can provide the next three-digit pattern on leads 25b. To this end, leads 25b extend to 3-to-8 decoder 137 which responds to the current pattern on leads 25b by providing a "1" on a particular one of its output leads 138 associated with that pattern. Each one of leads 138 extends to the clear input of a respective one of flip flops 122, thereby causing the flip-flop associated with the one of leads 111 whose "1" was just encoded by priority encoder 139 to be changed to "0" and thereby changing the bit in question from a "1" to a "0" in memory 20.

The output processing proceeds in this manner until the six-digit pattern associated with each set one of the bits identified by the input pattern in latch 127 has been provided on leads 25b. It is premature, however, for stage $S_2$ to latch in the new pattern waiting on lead 35 because that pattern must continue to be provided to stage $S_1$ on leads 25a until such time as that stage has read in the pattern which includes the new three digits now waiting on leads 25b.

Once stage $S_1$ has read in that pattern, however, it pulses lead 28. The resulting "1" on that lead is inverted to a "0" by inverter 132, the output of which is applied to one input of NOR gate 104. The remaining inputs of NOR gate 104 are taken from the Q outputs of flip flops 122, which are all "0" at this time. Accordingly, the output of NOR gate 104 goes high, thereby pulsing lead 38 via OR gate 131. This causes the three-digit pattern waiting on leads 35a to be latched into latch 127 and a new pattern to be thereafter supplied on those leads by sort stage $S_3$. The process repeats until all of the patterns have been output.

As previously noted, sort stages $S_1$ and $S_3$ are very similar to sort stage $S_2$. However, stage $S_3$ does not include circuitry corresponding to latch 35 or multiplexer 101. Indeed, since memory 30 stores but a single 8-bit word, no addresses need be applied thereto. The differences between stage $S_2$ and stage $S_1$ are that the latter's latch receives, and is adapted to hold, six-rather than three-digit patterns, i.e., the patterns appearing on leads 25a-b. Similarly, its address multiplexer receives, and is adapted to multiplex, six-rather than three-digit patterns. Moreover, in stage $S_1$ "output new value" lead 18 substitutes for "new pattern request" lead 28 of stage $S_2$.

As noted above, the sort circuit of FIGS. 1-2 does not keep track of duplicate values. If desired, however, duplicate values can be kept track of using the auxiliary circuit shown in FIG. 5 in conjunction with the sort circuit of FIGS. 1-2.

In particular, the auxiliary circuit of FIG. 5, like the sort circuit itself, receives the 9-digit input words on leads 45a-c, which are shown in FIG. 5 as being bundled into a cable 45. The auxiliary circuit also receives the 8-bit output words of memory 10 (FIGS. 1-2) on leads 141. The latter leads, although not shown explicitly elsewhere in the drawing, correspond generally to output leads 111 of memory 20. Leads 141 extend to 8-to-1 data selector 143, which responds to the 3-digit pattern on leads 45c to provide on its output lead 144 the value of the bit associated with the current input word. Lead 144, in turn, extends to one input of each one of eight AND gates 153.

The first time a particular input value occurs during input processing, lead 144 carries a "0" since the associated bit in memory 10 is "0". The outputs of AND gates 153 are thus all "0", thereby providing the binary word 00000000 to increment circuit 156. The function of the latter is to increment by unity the word provided to it, and thus at this time it provides the binary word 00000001 via a cable 157 to the data input of an extension memory 151.

Memory 151 stores an 8-bit count associated with each input word value to indicate how many times the value in question has occurred in the input word stream. At this time, the address input of memory 151 is receiving the input word on cable 45 via a multiplexer 148. Thus when "input new word" lead 41—which extends to the write input of memory 151—is pulsed, the binary count 00000001 is stored in a location within memory 151 associated with the current input word value, thereby indicating that that value has thus far occurred once.

Each one of AND gates 153 receives its second input from a respective one of the eight output leads 152 of memory 151. Since lead 144 carries a "1" upon the second and each subsequent occurrence of a particular input value, AND gates 153 are enabled upon any such occurrence to pass the current count associated with that input value to increment circuit 156. That count is thus again incremented by unity and then rewritten into the memory.

The auxiliary circuit of FIG. 5 also receives leads 15a-c, which are shown in FIG. 5 as being bundled into a cable 15. During output processing, multiplexer 148 provides the 9-digit sorted words from cable 15 to the address input of memory 151. Thus as each sorted word in output on cable 15, the count associated therewith is provided on leads 152, and thence onto a cable 16.

Since memory 151 stores 8-bit words, the auxiliary circuit is capable of keeping track of $2^8 = 256$ duplicates of each input value. If more than 256 duplicates are possible in a particular application, the extension memory can be enlarged accordingly.

Figure 6:
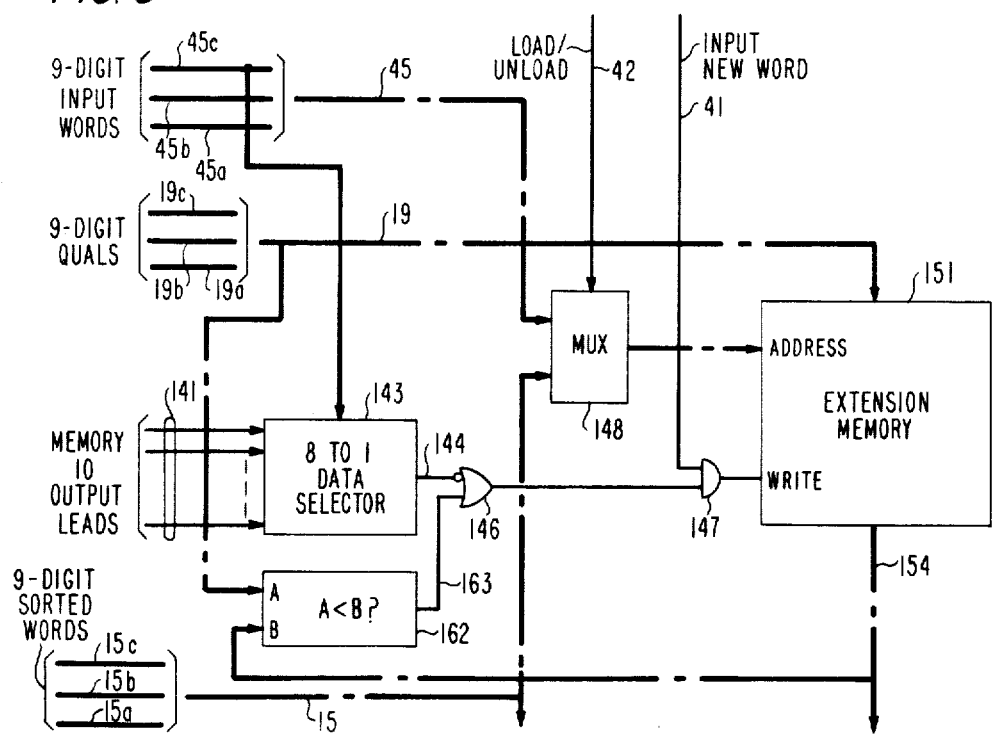
FIG. 6 is a block diagram of an auxiliary circuit which can be used in conjunction with the sort circuit of FIGS. 1-2 to sort pairs of coordinates in accordance with one of the coordinate values.

Another auxiliary circuit that can be used in conjunction with the sort circuit of FIGS. 1-2 is shown in FIG. 6. This circuit is useful in real-time graphics display applications, for example, where it is desired to sort sets of (x,z) coordinates in accordance with the x-value. If more than one coordinate has the same x-value, then it is desired to provide in the sorted-by-x-value-coordinate output stream the one of those (x,z) coordinates having the smallest z-value.

The circuit of FIG. 6 is similar in many respects to that of FIG. 5 and the corresponding components bear the same reference numerals.

During input processing, the x-values appear on cable 45 and the accompanying z-values—referred to as "qualifiers"—appear on leads 19a–c of a cable 19. The x-values are sorted by the sort circuit of FIGS. 1–2, as previously described, and within the auxiliary circuit of FIG. 6, as in the auxiliary circuit of FIG. 5, lead 144 carries a "0" the first time that a particular value occurs. That "0" is inverted at the inhibit input of OR gate 146, thereby providing a "1" to one input of AND gate 147. The other input of AND gate 147 is taken from "input new value" lead 41, while the output thereof extends to the write input of extension memory 151. The input to memory 151 comprises the z-values on cable 19 while its addresses are taken from cable 45 via multiplexer 148. The overall result, then, is that the first time a particular x-value occurs, the accompanying z-value is automatically written into memory 151.

At any subsequent time that that particular x-value occurs, the accompanying z-value overwrites the z-value previously stored in the memory only if the new z-value is smaller than the old one. In particular, since lead 144 carries a "1" at the second and any subsequent time that a particular x-value occurs, the output of OR gate 144 is "1", thereby causing the new z-value to be written in the memory, only if output lead 163 of comparison circuit 162 carries a "1". And that, in turn, will occur only if in fact the new z-value is smaller than that already stored.

During output processing, multiplexer 148 provides the addresses for memory 151 from cable 15 so that each z-value stored in memory 151 appears on the memory output cable 154 concomitant with the appearance of the corresponding sorted x-values on cable 15.

The foregoing merely illustrates the principles of the invention. For example, the invention can be used to sort values whose base is other than 2. Moreover, there are no constraints on how many sort stages are used to sort words of any given length nor are there any constraints, apart from what is explicitly stated above, as to how the $D_j$'s are chosen. In general, however, it is most efficient to select these parameters such that the quantity $[D_{j+1}-D_j]$ is the same for all j.

It will thus be appreciated that numerous arrangements may be devised by those skilled in the art which, although not explicitly shown or described herein, embody the principles of the invention.

I claim:

1. Apparatus for sorting a plurality of multi-digit words, said apparatus comprising
   a plurality of indicators,
   means responsive to each of said multi-digit words for setting m selected ones of said indicators, $m \geq 2$, the $j^{th}$ of said m indicators, $j=1,2,\ldots m$, being selected as a function of the values of the first through $D_j^{th}$ highest-order digits of said each multi-digit word, $D_1 > D_2 > \ldots > D_m$, and
   output means responsive to said set ones of said indicators for putting out said multi-digit words in a sorted order.

2. Apparatus for sorting a plurality of multi-digit words, said apparatus comprising
   m sort stages, $m \geq 2$, the $j^{th}$ of said stages, $j=1,2,\ldots m$, including a plurality of indicators each corresponding to a different possible pattern of the values of the first through $D_j^{th}$ highest-order digits of said multi-digit words, $D_1 > D_2 > \ldots > D_m$,
   means responsive to each of said multi-digit words for setting in said $j^{th}$ sort stage the indicator corresponding to the values of the first through $D_j^{th}$ highest-order digits of said each of said multi-digit words, and
   output means responsive to the set ones of said indicators for putting out said multi-digit words in a sorted order.

3. The apparatus of claim 2 wherein said output means includes means in said $j^{th}$ stage for at least one value of j, the last-mentioned means comprising
   means responsive to a $D_{j+1}$-digit pattern provided to said $j^{th}$ stage from the $(j+1)^{st}$ stage for identifying the indicators within said $j^{th}$ stage corresponding to $D_j$-digit patterns which have said $D_{j+1}$-digit pattern as their first through $D_{j+1}^{st}$ highest-order digits, and
   means at least responsive to the set ones of the identified indicators for providing to the $(j-1)^{st}$ stage the particular $D_j$-digit patterns associated with said set ones of the identified indicators.

4. The apparatus of claim 3 wherein said providing means includes priority encoder means and means for repetitively (a) applying said identified indicators to said priority encoder means to provide at least a portion of an individual one of said particular $D_j$-digit patterns for the $(j-1)^{st}$ sort stage and (b) clearing the individual one of said set ones of said identified indicators associated with said individual one of said $D_j$-digit patterns.

5. The apparatus of claims 3 or 4 wherein said $j^{th}$ stage includes means operative after all of said particular $D_j$-digit patterns have been provided to said $(j-1)^{st}$ stage for requesting that a new $D_{j+1}$-digit pattern be provided to said $j^{th}$ stage from said $(j+1)^{st}$ stage.

6. A method for sorting a plurality of multi-digit words, said method comprising the steps of
   setting m selected ones of a plurality of indicators in response to each of at least ones of said multi-digit words, $m \geq 2$, the $j^{th}$ of said m indicators, $j=1,2,\ldots m$, being set as a function of the values of the first through $D_j^{th}$ highest-order digits of said each of said multi-digit words, $D_1 > D_2 > \ldots > D_m$, and
   putting out said multi-digit words in a sorted order in response to said set ones of said indicators.

7. A method for sorting a plurality of multi-digit words, said method being adapted for use in conjunction with m pluralities of indicators, $m \geq 2$, the indicators in the $j^{th}$ of said pluralities, $j=1,2,\ldots m$, each corresponding to a different possible pattern of the values of the first through $D_j^{th}$ highest-order digits of said multi-digit words, $D_1 > D_2 > \ldots > D_m$, said method comprising the steps of
   setting in response to each of said multi-digit words the indicator in said $j^{th}$ of said pluralities corresponding to the values of the first through $D_j^{th}$ highest-order digits of said each of said multi-digit words, and
   putting out said multi-digit words in a sorted order in response to the set ones of said indicators.

* * * * *